June 27, 1950

A. S. PERLSTEIN
NOW BY JUDICIAL CHANGE OF NAME
A. S. PELLARD
LIPSTICK HOLDER
Filed Nov. 5, 1946

2,513,046

INVENTOR.
ALFRED S. PERLSTEIN
BY
ATTORNEY

Patented June 27, 1950

2,513,046

UNITED STATES PATENT OFFICE 2,513,046

LIPSTICK HOLDER

Alfred S. Perlstein, Elmhurst, N. Y., now by judicial change of name Alfred S. Pellard Application November 5, 1946, Serial No. 707,904

1 Claim. (Cl. 132—79)

This invention relates to toilet accessories, particularly to lipsticks.

As is well known, proper application of a lipstick requires use of a mirror. Customarily, any available mirror is employed, such as a mirror kept in or fastened to a lady's handbag, a mirror inside of a compact, etc. The use of such mirrors is not always convenient. A place must be found on which a loose mirror or a handbag to which a mirror is fastened can be placed. A compact with a mirror at the inside must be opened so that its contents may be spilled.

One object of the invention is to provide means which greatly facilitate the use of a mirror in connection with the application of a lipstick.

Another object of the invention is to provide means by which the necessity of hunting for a mirror whenever the use of a lipstick is intended is eliminated.

Another object of the invention is to provide means by which a mirror is always in readiness when it is desired to use a lipstick.

Another object of the invention is a novel and improved lipstick the casing of which is permanently united with a mirror.

Another object of the invention is a novel and improved lipstick the usefulness and ornamental appearance of which are greatly enhanced.

Other and further objects, features and advantages of the invention will appear hereinafter and be pointed out in the appended claims forming part of the application.

On the accompanying drawing a now preferred embodiment of the invention is shown by way of illustration and not by way of limitation.

Figure 1:
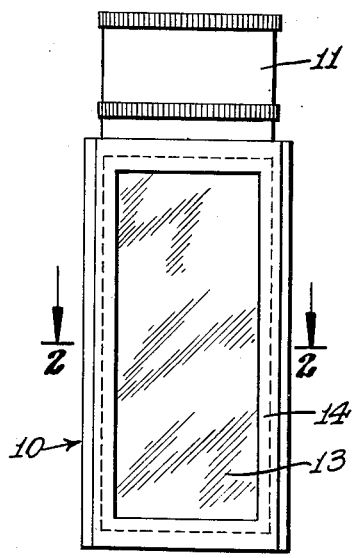
Fig. 1 is an elevational side view of a lipstick with a mirror according to the invention.
Figure 2:
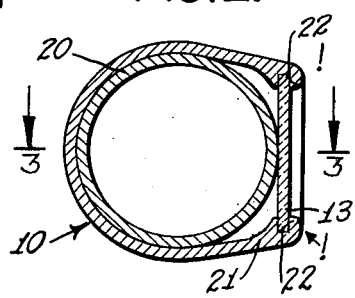
Fig. 2 is a section along line 2—2 of Fig. 1.
Figure 3:
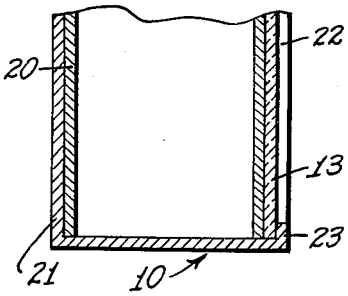
Fig. 3 is a section along line 3—3 of Fig. 2.

Referring now to the figures in detail, a lipstick according to the invention comprises a casing, generally designated 10, which serves to receive a holder 11 within which the lipstick proper is slidably fastened in a conventional manner. The holder is tightly fitted into casing 10 which serves to protect the lipstick proper when the same is withdrawn into the holder and not in use. As lipstick holders of this type are well known in the art, and not essential for the understanding of the invention, they need not be described here in detail. The holder and the casing may be made of any suitable material such as metal or plastic, the latter having the advantage of low manufacturing costs. Casing 10, as shown in Figs. 2 and 3, is composed of an inner tube 20 closed at the bottom and having a circular cross section. Circular tube 20 is fitted in an outer tube 21. Tubes 20 and 21 are secured to each other by any suitable means such as a tight fit or soldering. Tube 21 is slotted to form a gap in which mirror 13 is inserted. The mirror may abut against inner tube 20 and be secured in its position by any suitable means such as bent-off edges 22 and 23 of tube 21 to form a frame 14 for the mirror, as shown in Fig. 1. The term "mirror," as used herein, is intended to designate any reflecting surface and may be made of silver coated glass, silver coated plastic, polished metal or any other suitable material. The frame 14 may hold the mirror at all four sides as indicated in Fig. 1, or be provided only at two longitudinal sides of the mirror. In the event a plastic casing is employed, mirror and casing can be united during the process of making the casing. The shape of the mirror corresponds preferably to the outline of casing 10 but the mirror may be extended beyond the outline of the casing or be smaller than the same. It is only essential that the shape and size of the mirror are selected so that a person using the mirror can conveniently see her lips in the mirror.

When it is intended to use a lipstick according to the invention, the holder is withdrawn from the casing and the lipstick applied with one hand in a conventional manner while the other hand is used to hold the casing with the mirror.

The embodiment according to Figs. 1 to 3 has the advantage that the casing has a circular inner cross section, thereby permitting the use of a conventional holder, while at the same time standard sheet metal can be used for the tubes.

It will of course be understood that a magnifying mirror may also be employed.

While the invention has been described in detail with respect to a certain now preferred example and embodiment of the invention it will be understood by those skilled in the art after understanding the invention that various changes and modifications may be made without departing from the spirit and scope of the invention, and it is intended, therefore, in the appended claim, to cover all such changes and modifications.

What is claimed as new and desired to be secured by Letters Patent is:

A lipstick comprising a lipstick holder, a casing to slidably receive said holder, said casing composed of an inner tube with substantially circular cross section for the reception of the holder and an outer tube mounted concentrically with the inner tube and having a gap extended in axial direction, and a mirror inserted in said gap to complete the wall of the outer tube of the casing.

ALFRED S. PERLSTEIN.

REFERENCES CITED

The following references are of record in the file of this patent:

UNITED STATES PATENTS

| Number | Name | Date |
|---|---|---|
| 1,441,590 | Lalanne | Jan. 9, 1923 |
| 1,766,990 | Freeman | June 24, 1930 |
| 1,983,083 | Irelan | Dec. 4, 1934 |